United States Patent

Shadduck

[15] 3,667,519

[45] June 6, 1972

[54] FOOD CHOPPER

[72] Inventor: Laurine R. Shadduck, 6220 Byron Street, Rosemont, Ill. 60018

[22] Filed: Apr. 9, 1970

[21] Appl. No.: 26,952

[52] U.S. Cl..................................146/160, 30/301, 30/316
[51] Int. Cl.......................................A47j 43/00, B26b 3/04
[58] Field of Search ...............146/160, 40; 30/301, 302, 316

[56] References Cited

UNITED STATES PATENTS

| 700,725 | 5/1902 | Bone | 30/301 |
| 2,782,826 | 2/1957 | Zysset | 146/160 |
| 935,576 | 9/1909 | Bates | 30/301 |
| 990,561 | 4/1911 | Kandlbinder | 30/301 X |
| 1,530,822 | 3/1925 | Gibson | 30/316 X |

*Primary Examiner*—Willie G. Abercrombie
*Attorney*—David D. Kaufman

[57] ABSTRACT

A hand-operated food chopper has concentric cylindrical cutting blades which have large openings in their vertical walls to permit flow of chopped materials therethrough and prevent clogging. Spring-actuated motion of one or more of the blades is also provided to further insure against clogging.

3 Claims, 6 Drawing Figures

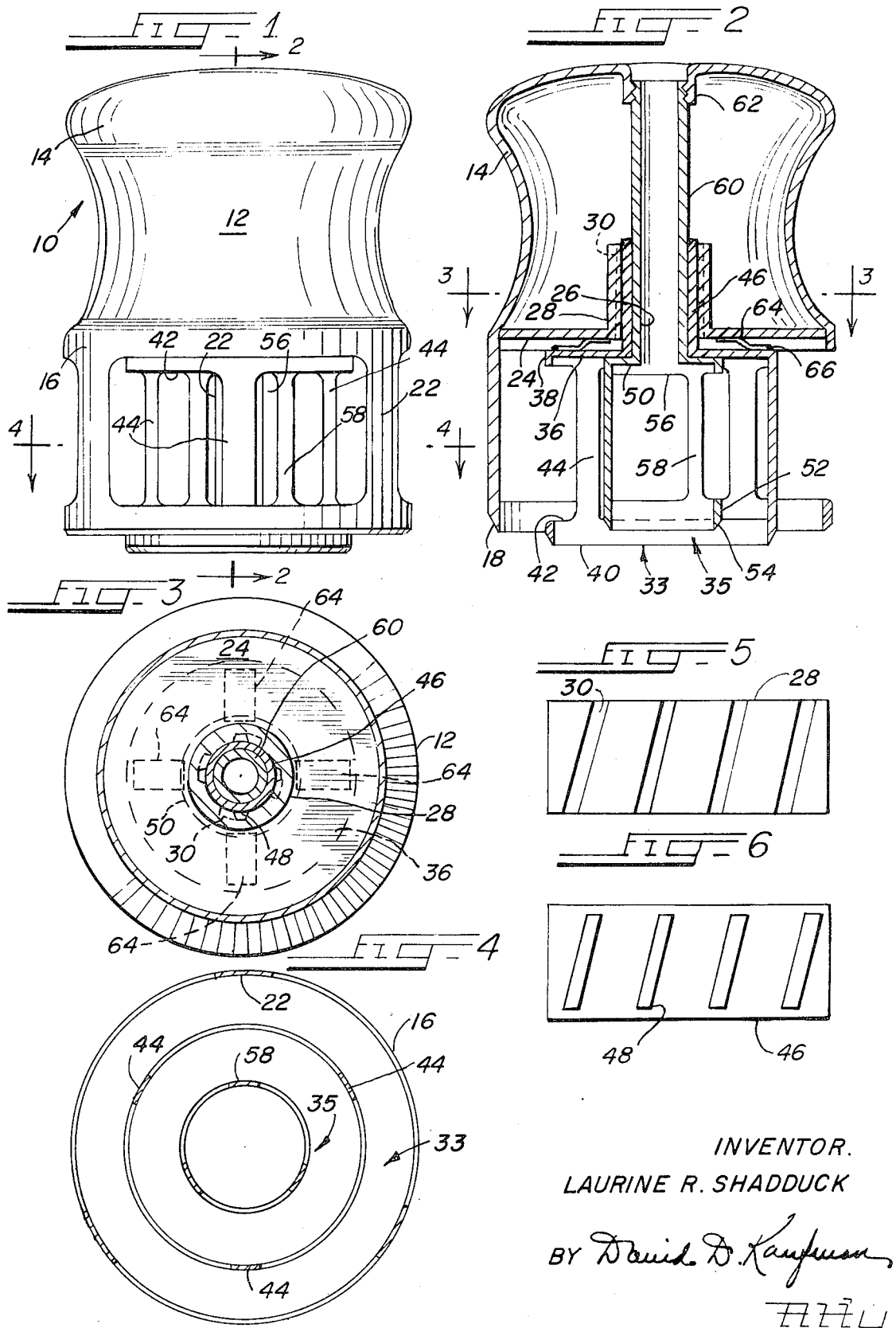

FOOD CHOPPER

This invention relates to kitchen utensils and more particularly to hand-operated devices for chopping or cutting various foods, such as vegetables, fruits, nuts, and the like.

Instruments for chopping of sectioning foods have heretofore been provided in a multitude of forms and operational characteristics ranging from the simplest and, perhaps, most universal, single-bladed knife to highly specialized devices of limited applicability such as, for example, a bank of taut wires for slicing hard-boiled eggs. A truly universal instrument is of course a virtual impossibility because of the great variety of problems inherent in treating the many different types of foods.

A group of foods possessing common treatment problems may be said to comprise the firm or crisp foods such as, cabbage, celery, lettuce, nuts, apples, etc. Chopping a vegetable like cabbage with a single-bladed knife is not only tedious and somewhat dangerous, but it is also objectionable because the cut or shredded segments tend to scatter undesirably over or off the cutting surface. Efforts to cope with these problems have produced devices with concentric cylindrical chopping blades, but the latter have proved wholly unsatisfactory because of the tendency of the chopped material to cling to and become impacted or wedged between the blades. This necessitated frequent use of a separate prying instrument to unclog the chopping device. Leaving the concentric blades uncovered or open at their tops (as in U.S. Pat. No. 468,893) merely simplified the job of prying loose the impacted chopped materials and also resulted in a scattering of the chopped materials from off the tops of the blades as the device was reciprocated during use. As a result, concentric-blade chopping devices have fallen into disuse despite the otherwise apparent desirability of such structures.

It is therefore a primary object of this invention to provide an improved hand-operated food chopper with concentric blades which overcomes the shortcomings described hereinabove.

Another object of the invention is to afford an improved food chopper of the character described which is particularly adapted for chopping firm and crisp foods but which nonetheless eliminates or greatly reduces clogging.

A further object is to provide an improved food chopper of the character described which may be readily assembled and disassembled for purposes of cleaning, maintenance and replacement of parts.

Still another object is to afford an improved food chopper of the character described which is simple to use, durable, and highly efficient for the purposes intended.

With the foregoing and other objects in view, which will appear as the description proceeds, the invention comprises generally a handle member whose lower portion terminates in a cylindrical outermost cutting blade. A pair of cylindrical inner cutting blades is releasably connected to the handle member with said blades arranged concentrically of the outermost blade. All of the blades have substantial areas removed from their vertical walls and these cutouts function as flowthroughs for the cut or chopped materials. In addition, means is provided for automatically rotating and longitudinally moving one of the cutting blades with each compression and release of the chopper from the cutting surface, thereby further serving to prevent clogging.

For the purpose of facilitating an understanding of the invention, there is illustrated in the accompanying drawing a preferred embodiment thereof, from an inspection of which, when considered in connection with the following description, the invention, its mode of construction, assembly and operation, and its advantages should be understood and appreciated.

Referring to the drawing in which the same characters of reference are employed to indicate corresponding or similar parts throughout the several figures:

FIG. 1 is an elevational view of an improved food chopper embodying the principles of the invention;

FIG. 2 is a vertical sectional view taken on the plane of line 2—2 in FIG. 1;

FIG. 3 is a horizontal sectional view taken on the plane of line 3—3 in FIG. 2;

FIG. 4 is a similar view taken on the plane of line 4—4 in FIG. 1; and

FIGS. 5 and 6 are developed views of the inner surface of a stationary collar and the outer surface of the neck of one of the blades, respectively, showing the means carried by said surfaces which cooperate to cause rotation of the blade.

Turning with greater detail to the various figures of the drawing, it will be seen that reference character 10 indicates generally a food chopper embodying the principles of the invention. The chopper 10 comprises a body member 12 having an upper handle portion 14 and a lower cylindrical portion 16 which terminates in a sharpened cutting edge 18 and thereby functions as the outer blade of the chopper. It should be noted that the outer blade 16 has substantial areas removed from its vertical wall to provide large cutouts or flowthrough openings 20, and the aggregate area defined by these openings represents a large portion of the original fabric of the blade. In a preferred construction, three flowthrough openings 20 are provided and only sufficient material is left in blade 16 to provide the integral structural struts 22, said openings thereby comprising in the aggregate approximately 70 to 80 percent of the blade's surface area.

Outer blade 16 and handle portion 14 are separated by an internal divider plate 24 which is formed with a central opening 26 therein. An annular collar 28 circumscribes the opening 26, and the collar 28 has a plurality of angular or spiral-segment trackways 30 formed in its inner wall, for reasons which will soon become apparent.

Cooperating with the outer blade 16 are a cylindrical intermediate blade 33 and a cylindrical inner blade 35. Intermediate blade 33 comprises a top wall 36 and a vertical wall 38 which terminates in a cutting edge 40. As with outer blade 16, the vertical wall 38 of intermediate blade 33 is formed with flowthrough openings 42 separated by integral struts 44. Intermediate blade 33 comprises further an annular central neck 46 which projects integrally from top wall 36. Neck 46 is dimensioned for a nice sliding fit within the collar 28, and is further formed with a plurality of angular or spiral-segment threads or teeth 48 which are adapted to ride in the trackways 30 formed in collar 28 (see FIGS. 3, 5 and 6). The neck 46 and collar 28 thereby function as a form of screw wheel due to the meshing of the teeth 48 in the trackways 30.

Inner blade 35 comprises similarly a top wall 50 and a vertical wall 52 which terminates in a cutting edge 54. Vertical wall 52 is formed with flowthrough openings 56 separated by integral struts 58. A central shaft 60 projects upwardly from the top wall 52 and is adapted to be telescopically received by the neck 46 of the intermediate blade 33. The free end of shaft 60 is formed with threading adapted to be received by an internally threaded boss 62 which depends from the inner surface of the body member handle portion 14. It will thus be appreciated that the three blades 16, 33 and 35 may be readily assembled and disassembled by means of the threaded shaft 60 and boss 62.

Leaf-springs 64 are mounted on the top wall 36 of intermediate blade 33, by any suitable means such as spot welding 66, and project upwardly therefrom. As illustrated in FIGS. 2 and 3, the springs 64 are positioned between the intermediate blade 33 and the divider plate 24 when the chopper 10 is in operationally assembled condition, thereby causing cutting edge 40 to depend below cutting edges 18 and 54.

When the chopper 10 is applied to a food to be chopped, such as a wedge of cabbage, a stalk of celery, or the like, the springs 64 are compressed until the three cutting edges 18, 40 and 54 are in the same horizontal plane. Due to the very large areas afforded by the flowthrough openings 20, 42 and 56, the cut or chopped food material tends to flow through these openings instead of becoming lodged between the blades. At the same time, the screw wheel cooperation of the collar 28 and neck 46 rotates intermediate blade 33 slightly in one direction so that when the chopper is lifted, the released springs 64 automatically move the said blade outwardly and cause the same to rotate back in the opposite direction. This combined longitudinal and rotational movement of the intermediate blade 33 acts further to dislodge chopped food material which might otherwise tend to become wedged between the blades.

It should be apparent from the foregoing that the invention provides an improved concentric-blade food chopper which eliminates the objectionable features inherent in similar prior devices. The flowthrough openings and automatic combined longitudinal-rotational motion of the intermediate blade combine to prevent wedging of chopped food material between the blades. Also, the solid top walls of the blades serve to cause the chopped food material to drop to the cutting surface in a limited area generally defined by the outer blade 16 instead of permitting wide dispersal thereof.

I claim:

1. In a food chopper having a handle and a plurality of concentric cylindrical cutting blades, said blades including a vertical wall and a cutting edge at the bottom thereof, the improvement comprising:

flowthrough openings formed in the vertical walls of said blades with adjacent flowthrough openings being separated by relatively narrow structural struts and aggregating a substantial portion of the surface area of each of said vertical walls;

a centrally apertured cover member closing the top of the outermost of said blades;

a collar circumscribing the central aperture of said cover member;

a plate member closing the top of an inner one of said blades;

a neck projecting from said plate member and adapted to be received by said collar;

cooperating spiral screw segments formed on said neck and collar; and spring means mounted on said plate member and cooperating with said cover member to urge said one blade outwardly so that the cutting edge thereof is normally positioned outwardly of the cutting edge of the outermost blade, whereby said one blade automatically moves longitudinally and rotationally responsive to each compression of the chopper against a resistive surface and release thereof.

2. The food chopper of claim 1 and further comprising:
a third blade positioned interiorly of said one blade;
a plate covering the top of said third blade;
a shaft projecting from said last-mentioned plate and adapted to be telescopically received by said neck; and
means for releasably connecting the operationally assembled three blades to said handle.

3. The food chopper of claim 2 in which said handle comprises an integral extension of said outermost blade, and said last-mentioned means comprises an internally threaded boss on said handle and cooperating threading on the free end of said shaft.

* * * * *